United States Patent [19]

Okamoto

[11] Patent Number: 4,874,937

[45] Date of Patent: Oct. 17, 1989

[54] DIGITAL SUN SENSOR

[75] Inventor: Tsuguhiko Okamoto, Yokohama, Japan

[73] Assignee: Kabushiki Kaisha Toshiba, Kawasaki, Japan

[21] Appl. No.: 23,719

[22] Filed: Mar. 9, 1987

[30] Foreign Application Priority Data

Mar. 12, 1986 [JP] Japan .................................. 61-54094

[51] Int. Cl.$^4$ .......................... G01C 1/00; G01B 11/26
[52] U.S. Cl. .................................. 250/203 R; 356/152
[58] Field of Search ......................... 250/203 R, 203 S; 126/424, 425; 356/141, 152

[56] References Cited

U.S. PATENT DOCUMENTS

| | | | |
|---|---|---|---|
| 3,951,550 | 4/1976 | Slick | 356/141 |
| 4,018,532 | 4/1977 | Fletcher et al. | 250/203 S |
| 4,211,922 | 7/1980 | Vaerewyck et al. | 250/203 S |
| 4,314,761 | 2/1982 | Reymond et al. | 356/141 |
| 4,315,690 | 2/1982 | Trocellier et al. | 250/203 R |

FOREIGN PATENT DOCUMENTS 59-220610 12/1984 Japan .

Primary Examiner—Edward P. Westin
Attorney, Agent, or Firm—Oblon, Fisher, Spivak, McClelland & Maier

[57] ABSTRACT

A digital sun sensor having an ND filter, a prism, an opaque layer formed on the prism and having a slit, a band-pass filter, and a linear array sensor. A sunbeam passes through ND filter, and is diffracted as it passes through the slit, and is refracted by prism. The diffracted sunbeam, which has a specified wavelength, passes through the band-pass filter and reaches the linear array sensor. The sensor is driven by a first clock signal, thereby generating electrical signals. An automatic gain control circuit maintains these signals at a constant peak value. The output signal of automatic gain control circuit is compared with a reference level. When this output is at a level lower than the reference level, the first clock signal is supplied to an N-bit counter. When the output is at a level higher than the reference level, a second clock signal having a frequency half that of the first clock signal is supplied to the N-bit counter. N-bit counter counts the pulses of either clock signal. Any pulse of the second clock signal, that has been counted by the counter, is input to the lowest bit-input terminal of an (N+1)-bit latch circuit, and the pulses of the first clock signal, which have been counted by the counter, are input to the other N-bit input terminals of the latch circuit.

1 Claim, 5 Drawing Sheets

DIGITAL SUN SENSOR

BACKGROUND OF THE INVENTION

The present invention relates to a digital sun sensor for measuring the attitude of an artificial satellite of three-axis stabilized type of spin-stabilized type.

The digital sun sensors previously used can be classified into the following two types:
1. Sensors having a V-slit
2. Sensors having Gray-code patterns.

Figure 1:
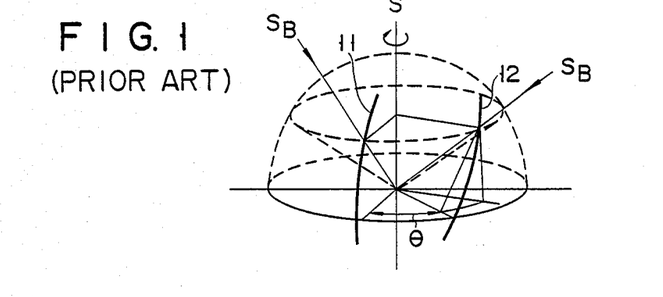
FIG. 1 is a schematic view showing a conventional digital sun sensor.
Figure 2A:
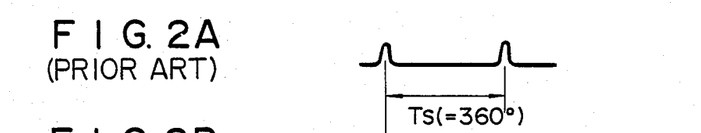
FIG. 2A and FIG. 2B show the waveforms of pulse signals, explaining the operation of the sun sensor shown in FIG. 1.
Figure 2B:
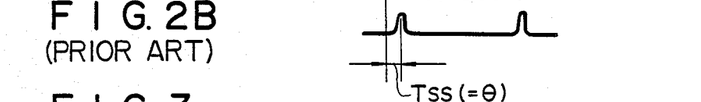

The sun sensor of the first type is designed for use in spin-stabilizd satellites. As is shown in FIG. 1, it has two elongated sensors 11 and 12 each comprising a slit and a photocell (not shown). The first sensor 11 extends in parallel to the spin axis S of the satellite. Second sensor 12 is inclined at a predetermined angle to spin axis S. Sensor 12 is so positioned that, in the plane containing the center of the satellite and being perpendicular to spin axis S, angle $\theta$ is defined by the line joining the enter of satellite and the intersection of the plane and the slit of first sensor 11 and the line connecting the center of the satellite and the intersection of the slit of second sensor 12 and this plane. First sensor 11 outputs a pulse signal shown in FIG. 2A as sunbeams pass through its slit while the satellite is spinning. The second sensor 12 generates a pulse signal shown in FIG. 2B as sunbeams pass through its slit while the satellite is spinning. The cycle Ts of the either pulse signal and the phase difference Tss between the pulse signals are measured. The angle at which spin axis S is inclined to the sunbeam SB (hereinafter called "sunbeam angle"), that is, the attitude of the satellite with respect to the sun, can be calculated from cycle Ts and phase difference Tss.

It is difficult to set angle $\theta$ correctly and to incline second sensor 12 exactly at the predetermined angle to spin axis S. Therefore, it is impossible for the sun sensor of the first type to detect the sunbeam angle to the accuracy of one degree or less. To make matters worse, the sun sensor of the first type cannot be used to detect the attitude of three-axis stabilized satellites.

Figure 3:
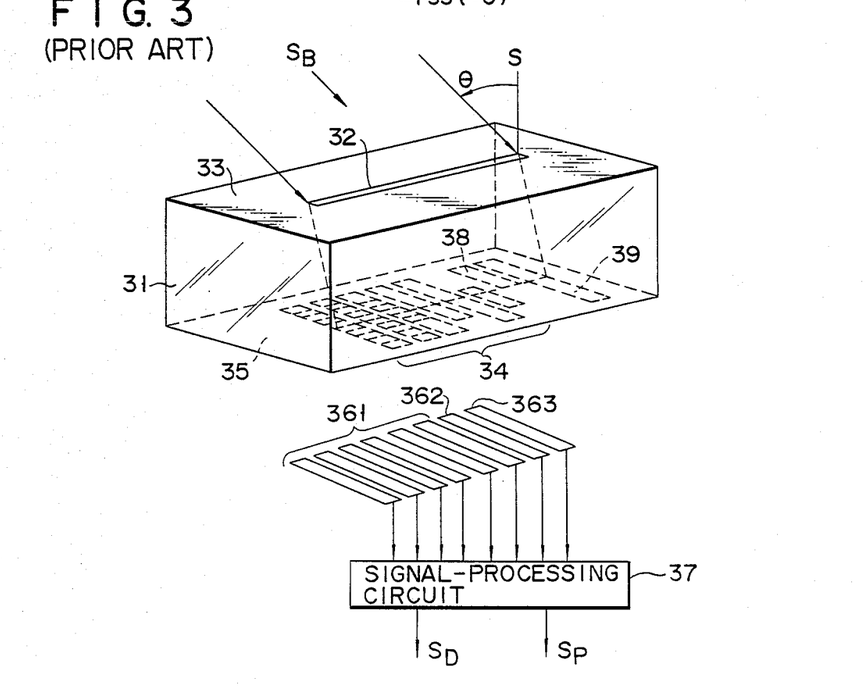
FIG. 3 is a schematic view showing another type of a conventional sun sensor.

The sun sensor of type 2 is designed for use not only in three-axis stabilized satellites, but also in spin-stabilized satellite. As is illustrated in FIG. 3, this sun sensor comprises rectangular prism 31 made of quartz or optical glass. Opaque films 33 and 35 are formed on the broadest opposing surfaces, respectively. Opaque film 33 has slit 32 cut in it by etching and which extends parallel to the axis of prism 31. A plurality of Gray-code patterns 34 are formed in opaque film 35 by means of etching. Each Gray-code pattern consists of a plurality of segments. The sun sensor further comprises arrays of photocells 361, provided in the same number of Gray-code patterns 34 and located below these patterns 34, respectively. The sun sensor is installed on a three-axis stabilized satellite such that slit 32 extend perpendicular to spin axis S of the satellite. Sunbeam SB enters prism 31 though slit 32, forming an elongated light spot on Gray-code patterns 34. The output signals of photocells 361 are input to signal-processing circuit 37.

More specifically, sunbeam SB incident on opaque film 33 at angle $\theta$ is refracted by prism 33, and then passes through one of the segments of each Gray-code patterns 34. Hence, sunbeam SB reaches photocells 361 located below these segments of Gray-code patterns. These photocells thus outputs "1" signals, whereas all other photocells 361 output "0" signals. Signal-processing circuit 37 identifies the segments receiving the refracted sunbeam SB, thereby obtaining angle SD corresponding to angle $\theta$.

Besides Gray-code patterns 34, sign-bit pattern 38 and sun pulse-generating pattern 39 are formed on opaque film 35. Pattern 39 is used when the sun sensor is used in a spin-stabilized satellite; it determines whether or not sunbeam SB has been applied to the sunbeam-receiving surface of the sun sensor. Two photocell-arrays 362 and 363 are provided below sign-bit pattern 38 and sun pulse-generating pattern 39. Upon receipt of the light beams passing through patterns 38 and 39, one of the photocells of array 362, and one of the photocells of array 363 generate "1" signals. Circuit 37 processes the output signals of the photocells, thereby producing sun pulse signal SP and the like.

The digital sun sensor of the second type is easier to set on a satellite than the sensor of the first type. Sunbeam SB falling on the earth is a light beam diverging at 0.5°. Hence, even if the segments of each Gray-code patterns are arranged at intervals corresponding to 0.5° or shorter intervals, angle $\theta$ (or angle SD) cannot be measured in the unit of less than 0.5°. In order to raise the accuracy of the measuring, an additional Gray-code pattern may be interposed among the Gray-code patterns, such that the leading edges of the segments in each additional pattern are aligned with the midpoints of the segments of the adjacent Gray-code pattern. If this method is used, the layout of the Gray-code patterns will become very complex. Since it is difficult to form such a complex pattern, it is in effect impossible to measure angle SD in the unit of less than 0.5°.

SUMMARY OF THE INVENTION

The object of the present invention is to provide a digital sun sensor which can accurately detect the angle at which the sunbeam is incident to an artificial satellite, that despite the fact that sunbeams diverge as they propagate away from the sun.

According to one aspect of the present invention, there is provided a digital sun sensor comprising a linear array sensor such as CCD having a light-receiving surface and a plurality of photosensing elements arranged in a line and designed to convert light into electrical charges, an opaque layer having a slit extending at right angles to the line in which said photosensing elements are arranged, and designed to diffract light, thereby to apply the light onto said linear array sensor, a prism interposed between said opaque layer and said linear array sensor, a band-pass filter mounted on the light-receiving surface of said linear array sensor for passing light of a specified wavelength, signal-generating means for converting the electical charges obtained by the photosensing elements into electrical signals, an automatic gain control circuit for maintaining the electrical signals supplied from said signal-generating means at a predetermined peak value, means for determining, from an output signal of said automatic gain control circuit, the position of the symmetry axis of the intensity distribution of the light incident on said linear array sensor, to the accuracy of half the intervals at which the photosensing elements are arranged, and means for calculating the incidence angle of the light from the position of the symmetry axis thus obtained.

DETAILED DESCRIPTION OF THE PREFERRED EMBODIMENTS

One embodiment of the invention will be described, with reference to FIGS. 4 to 9 and FIGS. 10A to 10G.

Figure 4:
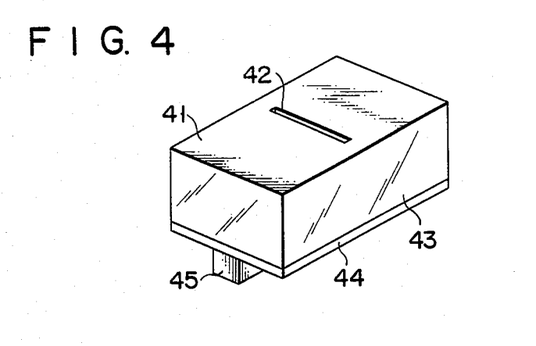
FIG. 4 is a perspective view of the optical system used in a digital sun sensor according to the present invention.
Figure 5:
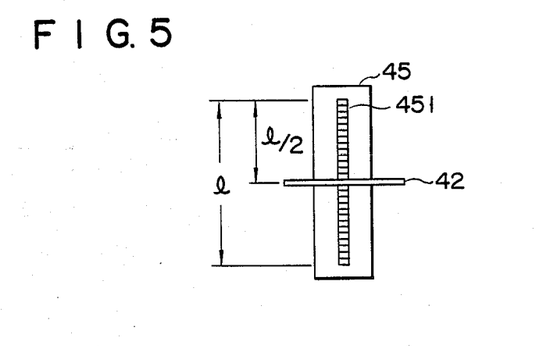
FIG. 5 shows one section of the optical system shown in FIG. 4.

FIG. 4 schematically shows the optical system used in a sun sensor according to the invention. As is shown in this figure, the optical system comprises rectangular prism 43 made of quartz or optical glass. Opaque film 41 is formed on the upper surface of prism 43. Band-pass filter 44 is formed on the lower surface of prism 43. Slit 42 is cut by photoresist process in the middle portion of opaque film 41, and extends at right angles to the axis of prism 41. Band-pass filter 44 passes only one component of light which has a specified wavelength. CCD linear array sensor 45 is attached on filter 44. As is illustrated in FIG. 5, sensor 45 comprises an array of photosensing elements which is crossing slit 42 at right angles and at its middle portion. Further, ND filter 46 is located on opaque film 41 as is shown in FIG. 6, to prevent the output of sensor 45 from being saturated when the intensity of sunbeam SB increases above a predetermined value.

Figure 6:
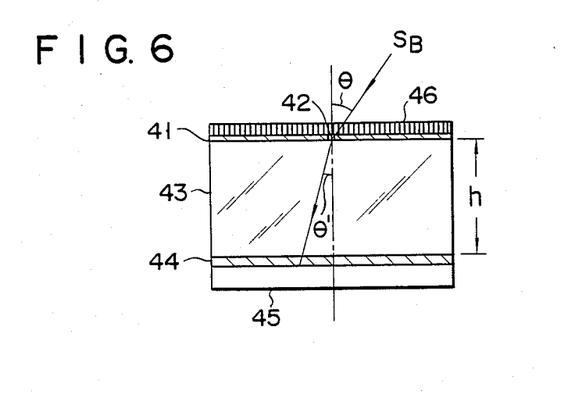
FIG. 6 is a transverse sectional view of the optical system.
Figure 7A:
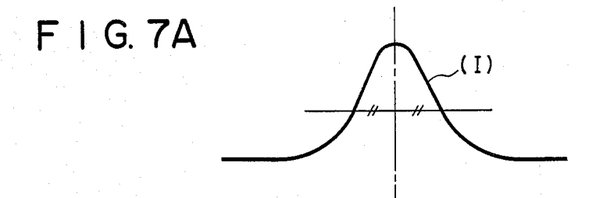
FIGS. 7A and 7B show the distributions of light intensity, explaining the function of the band-pass filter used in the optical system.
Figure 7B:
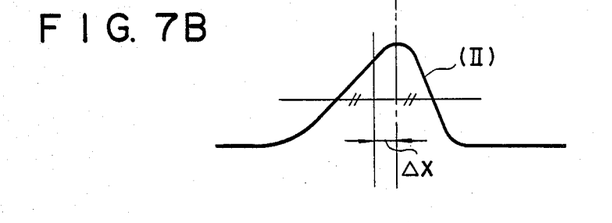

As is shown in FIG. 6, sunbeam SB comes to the optical system at incidence angle $\theta$, passes through ND filter 46, diffracted by slit 42, and enter prism 43. It is refracted by prism 43, and is applied through band-pass filter 44 onto CCD linear array sensor 45. Without prism 43, sensor 45 would detect light-intensity distribution I which is symmetrical, regardless of incidence angle $\theta$ of, as is illustrated in FIG. 7A. The components of diffracted sunbeam SB are refracted by different angles according to their wavelength, as they pass through prism 43. As a result, light-intensity distribution II detected by sensor 45 is asymmetrical as is shown in FIG. 7B. Due to distortion $\Delta x$ of the distribution (FIG. 7A), the sun sensor cannot accurately measure angle $\theta$. Band-pass filter 44 eliminates this undesired distortion $\Delta x$. Filter 44 passes only one component of sunbeam SB whose wavelength is preferably 550 nm since sensor 45 can most readily detect a light beam having a wavelength of about 550 nm. In other words, it filters out all other components of sunbeam SB, thereby obtaining a light-intensity distribution as symmetrical as distribution I.

Prism 43 is used and interposed between film 41 and filter 44, for two reasons. First, prism 43 increases the view angle of the digital sun sensor. Secondly, prism 43 eliminates the difference in angle resolution among the photosensing elements of sensor 45 regardless of incidence angle $\theta$ of sunbeam SB. Assume that prism 43 has a thickness h (FIG. 6), and has a refractive index n ($\approx 1.5 > 1$). Then, Snell's law of refraction teaches:

$$\sin \theta = n \sin \theta'$$

where $\theta$ is the maximum view angle of the sun sensor, and $\theta'$ is the maximum view angle which the sunsensor have if it were not provided with prism 43. Obviously, angle $\theta$ is greater than angle $\theta'$.

Figure 8:
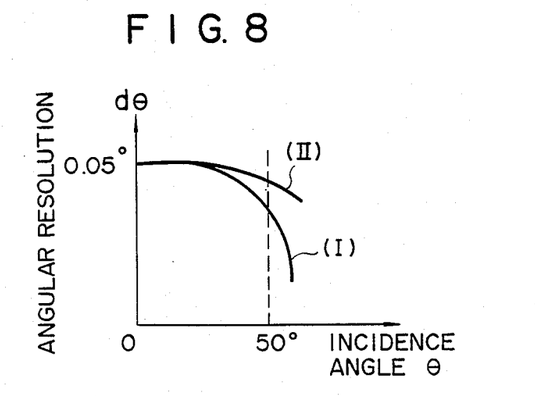
FIG. 8 is a graph illustrating the relation between the incidence angle of a sunbeam and the minimum angle which the optical system can detect.

Without prism 43, the angular resolution $d\theta$, i.e., the minimum angle which the sun sensor can detect, is given:

$$d\theta = dx \cos^2 \theta / h$$

where dx is the length of the photosensing element. Curve I in FIG. 8 represents the relation which angular resolution $d\theta$ and incidence angle $\theta$ would have when prism 43 were not interposed between opaque film 41 and band-pass filter 44. As can be clearly understood from the above equation and curve I, angle $d\theta$ would be reduced as incidence angle $\theta$ of sunbeam SB increases, without prism 43.

In the optical system of FIG. 6, wherein prism 43 is interposed between opaque film 41 and band-pass filter 44, angular resolution $d\theta$ is given:

$$d\theta = dx \cdot \frac{n}{h} \cdot \frac{\cos^2\left\{\sin^{-1}\left(\frac{1}{h}\sin\theta\right)\right\}}{\cos\theta} \cdot \frac{180}{\pi} \text{ [deg]}$$

Curve II in FIG. 8 shows the relation which angle $d\theta$ and incidence angle $\theta$ have in the optical system of FIG. 6. Obviously, angle $d\theta$ scarcely depends on incidence angle $\theta$ since prism 43 is used.

Thickness h of prism 43 is determined by the following equation:

$$h = 1/2 \tan \theta$$

where l is the length of CCD linear array sensor 45, and $\theta$ is the maximum view angle of the sun sensor. The more photosensing elements, the lower the angular resolution $d\theta$. Therefore, it is desired that sensor 45 be made of as many elements as possible. When CCD linear array sensor 45 has 2048 photosensing elements, and the maximum view angle of the sun sensor is ±50°, the angular resolution $d\theta$ will be 0.05°, as is shown in FIG. 8.

Figure 9:
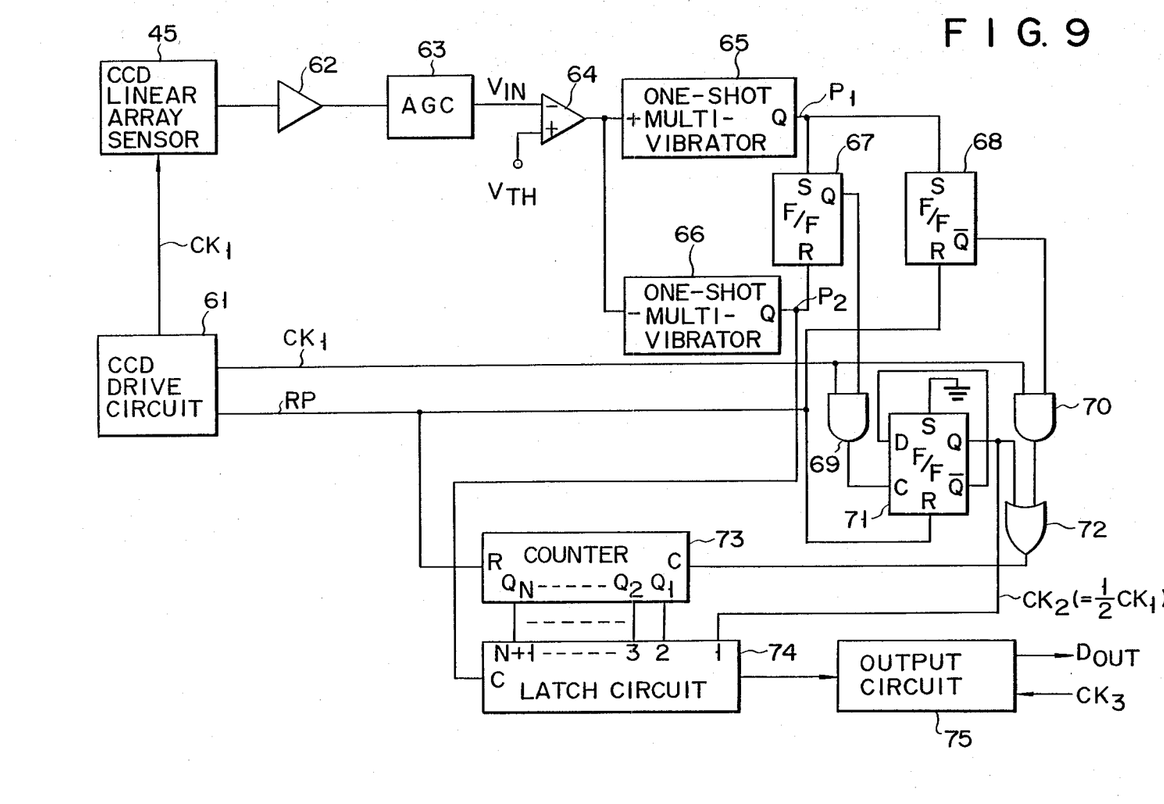
FIG. 9 is a circuit diagram showing the signal-processing system used in the sun sensor according to the invention.

FIG. 9 shows the signal-processing system of the digital sun sensor. As is illustrated in this figure, the signal-processing system comprises CCD drive circuit 61, preamplifier 62, AGC (Automatic Gain Control) circuit 63, comparator 64, first one-shot multivibrator 65, and second one-shot multivibrator 66. CCD drive circuit 61 supplies clock signal CK1 to CCD linear array sensor 45, thereby driving sensor 45. The output is supplied to preamplifier 62 and is thus amplified. The amplified output is input to AGC circuit 63. It is further amplified to a prescribed level. The output of AGC circuit 63, or voltage $V_{IN}$, is input to comparator 64. Comparator 64 compares voltage $V_{IN}$ with threshold voltage $V_{TH}$. It generates "1" signal when $V_{IN}$ is higher than, threshold voltage $V_{Th}$, and produces "0" signal when $V_{IN}$ is lower than $V_{TH}$. The output signal of comparator 64 is input to both one-shot multivibrators 65 and 66.

First one-shot multivibrator 65 generates pulse P1 every time the output of comparator 64 rises from "0" level to "1" level. Pulse P1 is supplied to the set terminals S of first and second R-S flip-flops 67 and 68. Second one-shot multivibrator 66 generates pulse P2 every time the output of comparator 64 falls from "1" level to "0" level. Pulse P2 is supplied to the reset terminal R of first R-S flip-flop 67, and also to the clock terminal C of latch circuit 74.

The signal-processing system further comprises 2-input AND gates 69 and 70, third R-S flip-flop 71, and 2-input OR gate 72. The Q output of first flip-flop 67 is supplied to one input terminal of AND gate 69. The $\overline{Q}$ output of flip-flop 68 is supplied to one input terminal of AND gate 70. Clock signal CK1 generated by CCD drive circuit 61 is supplied to the other input terminal of AND gate 69, and also to the other input terminal of AND gate 70. The output of AND gate 69 is supplied to clock terminal C of third S-R flip-flop 71 of D latch type. Flip-flop 71 has its set terminal S grounded, and its $\overline{Q}$ output terminal coupled to its D input terminal. The Q output of flip-flop 71 is supplied to one input terminal of OR gate 72. The output of AND gate 70 is supplied to the other input terminal of OR gate 72.

The signal-processing system includes counter 73, latch circuit 74 and output circuit 75. Counter 73 has N bit-output terminals. Latch circuit 74 has N+1 bit-input terminals. The Q output of flip-flop 71 is supplied to the first bit-input terminal of latch circuit 74. The output of OR gate 72 is supplied to the clock terminal C of counter 73. The bit-output terminals $Q_1$ to $Q_N$ of this counter are coupled to the second to (N+1) the bit-input terminals of latch circuit 74. The output of latch circuit 74 is temporarily stored in output circuit 75 (e.g., a memory). Upon receipt of clock signal CK3, output circuit 75 outputs data Dout.

CCD drive circuit 61 generates reset pulses RP at prescribed intervals. These pulses RP are supplied to the reset terminals R of second flip-flop 68, third flip-flop 71 and counter 73.

Figure 10A:
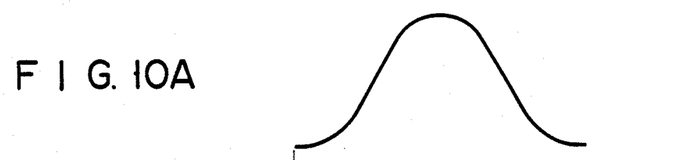
FIG. 10A to FIG. 10G show the waveforms of various signals, explaining the operation of the system shown in FIG. 9.
Figure 10B:
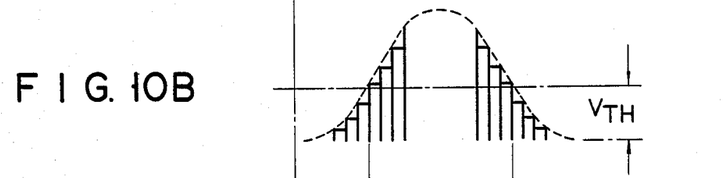
Figure 10C:
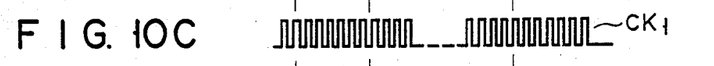

As has been described, the intensity distribution of sunbeam SB, which CCD linear array sensors 45 detects, is symmetrical as is shown in FIG. 10A, how large or small the incidence angle $\theta$ is. CCD drive circuit 61 continuously supplies sensor 45 with clock signal CK1 having the waveform shown in FIG. 10C. In response to the clock pulses of this signal CK1, the photosensing elements of sensor 45 generates different voltages as is shown in FIG. 10B. These voltages define the light-intensity distribution detected by sensor 45. The output of sensor 45 is amplified by preamplifier 62 and is then input to AGC circuit 63.

The intensity of sunbeam SB reaching sensor 45 is the cosine function of incidence angle $\theta$. Therefore, the peak output voltage of sensor 45 varies with incidence angle $\theta$ of sunbeam SB. This variation reduces the accuracy of comparator 64. Hence, AGC circuit 63 automatically controls the gain of the circuit, whereby the peak output voltage of sensor 45 remains constant. Even if incidence angle $\theta$ is large, and the output voltage of sensor 45 falls, AGC circuit 63 always outputs the same voltage $V_{IN}$.

Figure 10D:
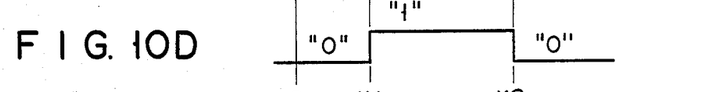
Figure 10E:
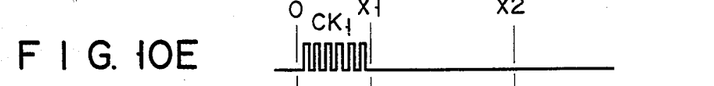

Comparator 64 therefore compares any output voltage $V_{IN}$ of AGC circuit 63 with threshold voltage $V_{TH}$ under the same condition. As is shown in FIG. 10D, comparator 64 produces a signal at "0" level when voltage $V_{IN}$ is lower than voltage $V_{TH}$, and a signal at "1" level when voltage $V_{IN}$ is higher than, threshold voltage $V_{TH}$.

The position of the symmetry axis of the light-intensity distribution detected by sensor 45 can be found from the output (FIG. 10D) of comparator 64. The position of this axis is given:

$$x_1+(x_2-x_2)/2$$

where $x_1$ is the distance between one endmost photosensing element of sensor 45 and the element which outputs a voltage is higher than voltage $V_{TH}$, and $x_2$ is the distance between the endmost element and the element which outputs a voltage lower than voltage $V_{TH}$.

Value $x_1$ is obtained in the following way. When the output signal of comparator 64 rises from "0" level to "1" level, first one-shot multivibrator 65 outputs pulse P1, thereby setting first and second flip-flops 67 and 68. The $\overline{Q}$ output of flip-flop 68 falls from "1" level to "0" level. Simultaneously, the Q output of first flip-flop 67 rises from "0" level to "1" level. As long as the Q output of flip-flop 67 remains at "0" level, or as long as the $\overline{Q}$ output of flip-flop 68 remains at "1" level, clock signal CK1 is supplied from CCD drive circuit 61 through AND circuit 70 and input to counter 73 through OR gate 72. Counter 73 counts the input clock pulses, thereby obtaining distance $x_1$.

Counter 73 can count all photosensing elements of CCD linear array sensor 45, and thus outputs an N-bit signal which represents any photosensing element of sensor 45. For instance, when sensor 45 has 2048 elements, counter 73 outputs an 11-bit signal.

Figure 10F:
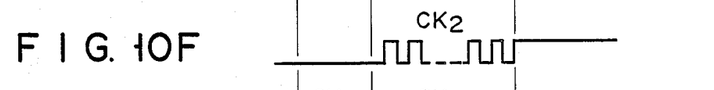

Value of $(x_2-x_1)/2$ is obtained in the following way. When the output signal of the photosensing element, located at distance $x_1$ from the endmost element, rises from "0" level to "1" level as is shown in FIG. 10D, first one-shot multivibrator 65 produces pulse P1. As a result, the Q output of first flip-flop 67 rises from "0" level to "1" level. When the output signal of the photosensing element, located at distance $x_2$ from the endmost element, falls from "1" level to "0" level as is shown in FIG. 10D, second one-shot multivibrator 66 produces pulse P2. The first flip-flop 67 is thereby reset. As long as the Q output of first flip-flop 67 is at "1" level, clock signal CK1 supplied from CCD drive circuit 61 is continuously input through AND gate 69 to third flip-flop 71. During this period, flip-flop 71 outputs clock signal CK2 from its Q output terminal. As is shown in FIG. 10F, this clock signal CK2 has a frequency which is half the frequency of clock signal CK1. Clock signal CK2 is supplied through OR gate 72 to counter 73. Hence, counter 73 counts the pulses of clock signal CK2. The number of clock pulses counted by counter 73 represents half the difference between distances $x_2$ and $x_1$, that is, $(x_2-x_1)/2$.

Figure 10G:
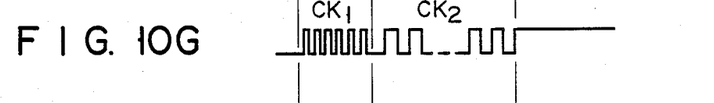

Therefore, the output of OR gate 72 has the pulse-waveform illustrate in FIG. 10G. Counter 73 counts all output pulses of OR gate 72, thereby finding $x_1 + (x_2 - x_1)/2$, i.e., the position of the symmetry axis of the light-intensity distribution detected by sensor 45, in the unit of the width of each photosensing element of sensor 45. When the number of pulses defining $(x_2 - x_1)$ is odd, second one-shot multivibrator 66 outputs the pulses shown in FIG. 10F plus one-half of a pulse. Counter 73 cannot count this one-half of a pulse.

The resolution of the light-intensity distribution is determined by the width of each of the elements of the sensor 45.

To decrease the angle resolution d of the sun sensor, the Q output of third flip-flop 71 is supplied to latch circuit 74. When the output signal of comparator 64 falls from "1" level to "0" level, the Q output of flip-flop 71 is at "0" level if $(x_2 - x_1)$ is represented by an even number of pulses, and is at "1" level if the number of pulses defining $(x_2 - x_1)$ is odd. The Q output of flip-flop 71 is supplied to the first bit-input terminal 1 of latch circuit 74 when the output pulse P2 of one-shot multivibrator 66 is inputted to clock terminal C of latch circuit 74. Simultaneously, the output bits $Q_1$ to $Q_N$ of counter 73 are supplied to bit-input terminals 2 to N+1 of latch circuit 74. Therefore, the data latched by circuit 74 represent the accurate position of the symmetry axis of the light-intensity distribution detected by CCD linear array sensor 45. The incidence angle $\theta$ of sunbeam SB can thus be correctly obtained from this data.

The data latched by circuit 74 is supplied to output circuit 75 and is edited in a prescribed format so that it may be used by an external device. Output circuit 75 supplies this data, i.e., data Dout, to the external device in synchronism with clock signals CK3 supplied from the external device.

The sun sensor according to the present invention can, therefore, measure incidence angle $\theta$ of sunbeam SB in the unit of less than 0.5°, at which angle sunbeam SB is diverging as it propagates from the sun. Moreover, it can measure angle $\theta$ accurately since it is possible to detect the position of the symmetry axis of the light-intensity distribution, which occurs as sunbeam SB passing slit 42 is diffracted, in the unit of half the width of the photosensing elements of CCD linear array sensor 45. Hence, when CCD linear array sensor 45 has 2048 photosensing elements, and the maximum view angle of the sun sensor is ±50°, angular resolution d$\theta$ 0.025°.

Figure 11:
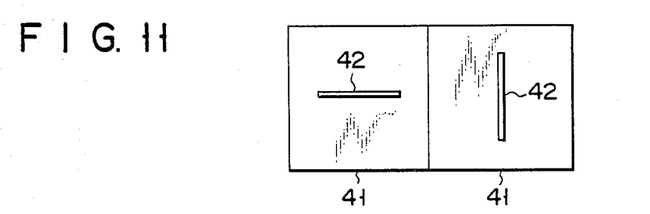
FIG. 11 is a plan view of another digital sun sensor according to the present invention.

FIG. 11 schematically shows another digital sun sensor according to the present invention. This sun sensor comprises two optical systems which are identical to the system shown in FIGS. 4 to 6. The two sensors are arranged such that their slits 421 and 422 are angularly displaced by 90°. Hence, the sun sensor can detect the position of the sun in a plane parallel to the sunbeam-receiving surface of the sun sensor.

The invention is not limited to the embodiments described above. For instance, the CCD linear array sensor can be replaced by any other optical sensor. Further, the present invention can be applied not only to a digital sun sensor, but also to a high-precision angle detector using a light source, such as a laser, which can emit an extremely parallel, visible light beam.

What is claimed is:

1. A digital sun sensor comprising:
   first clock signal generating means for generating a first clock signal;
   a linear array sensor having a light-receiving surface and a plurality of photosensing elements arranged in a line, and designed to convert light into electrical charges and to convert the electrical charges into electrical signals by the first clock signal;
   an opaque layer having a slit therein extending at right angles to the line in which photosensing elements are arranged for diffracting light, thereby to apply the light onto said linear array sensor;
   a prism interposed between said opaque layer and said linear array sensor;
   a band-pass filter mounted on the light-receiving surface of said linear array sensor for passing light of a specified wavelength;
   an automatic gain control circuit for maintaining the electrical signals supplied from said linear array sensor at a predetermined peak value;
   a comparator for comparing the output signal of said automatic gain control circuit with a predetermined reference level, thereby to produce an output signal which has a first level when the output signal of said automatic gain control circuit is equal to or higher than said reference level and has a second level when the output signal of said automatic gain control circuit is lower than the reference level;
   first timing pulse generating means for generating a first timing pulse when the output signal of said comparator changes from the second level to the first level;
   second timing pulse generating means for generating a second timing pulse when the output signal of said comparator changes from the first level to the second level;
   reset signal generating means for generating a reset signal before an electrical signal of the first photosensing element of said linear array sensor driven by the first clock signal is transferred to said automatic gain control circuit;
   first control signal generating means for continuously generating a first control signal upon receiving the reset signal from the reset signal generating means until the first timing pulse from said first timing pulse generating means has been received;
   second control signal generating means for continuously generating a second control signal upon receiving the first timing pulse from said first timing pulse generating means until the second timing pulse from said second timing pulse generating means has been received;
   second clock generating means for generating a second clock signal having a frequency half that of the first clock signal by dividing the frequency of the first clock signal when it receives the second control signal from said second control signal generating means;
   clock selecting means for selecting the first clock signal from said first clock generating means when it receives first control signal from said first control signal generating means and selecting the second clock signal from said second clock generating means when it receives the second control signal from said second control signal generating means;
   a counter having N bit-output terminals, where N is defined as an integer, for counting the pulses of the first and second clock signals selected by said clock selecting means, the counted value being cleared to "0" by the reset signal; and a latch circuit having (N+1) bit-input terminals, for receiving a pulse of said second clock signal at the lowest bit-input terminal, receiving the N output bits from said counter at the other bit-input terminals, and latching each bit input when it receives the second timing pulse from said second timing pulse generating means.

* * * * *